Patented Aug. 10, 1937

2,089,196

UNITED STATES PATENT OFFICE 2,089,196

NONSICCATIVE COMPLEX

Carleton Ellis, Montclair, N. J., assignor to Ellis-Foster Company, a corporation of New Jersey No Drawing. Application September 14, 1927, Serial No. 219,562

6 Claims. (Cl. 260—8)

This invention relates to synthetic resins and balsams or analogous solid to liquid products derived from non-drying animal or vegetable oils or their fatty acids and a reactive oxygenated body such as a polyhydric alcohol, preferably with the inclusion of a crystalline acid or anhydride of the aliphatic or aromatic series, as will be more fully hereinafter described.

The non-drying glyceride oils include lard oil, tallow oil, neat's-foot oil, palm kernel oil, cocoanut oil, and the like. The invention will be illustrated by examples of products prepared with the aid of cocoanut oil or its fatty acids. It should be understood, however, that other non-drying oils or their fatty acids such as palm kernel oil or its fatty acids, may replace the cocoanut oil or its fatty acids, as set forth illustratively in the subjoined examples. The employment of cyclic acids such as naphthenic acids likewise is not precluded.

The aforesaid reactive oxygenated bodies comprise a wide range of substances of differing chemical and physical properties. The following will serve in an illustrative way:

1. Glycerol, in its various forms,—dilute, concentrated, crude or refined.
2. Polyglycerols, or a mixture of polyglycerols and glycerol.
3. Various glycols, such as ethylene or propylene glycol.

These may be derived from petroleum gases, by suitable reaction. Mixtures of glycols sometimes obtained from this source may be used to advantage. The employment of glycols in this way is referred to in my copending application Serial No. 61,839 filed Oct. 10, 1925, of which the present application is a continuation in part.

4. Polyhydric alcohols containing a substituent in the hydroxyl, e. g., mono or dimethyl or propyl ether of glycerol. The mono ethyl ether of ethylene glycol has one hydroxyl free for reactive purposes. The glycerol and the glycol derivatives behave quite differently in the reaction, owing to different polymerizing tendencies and other properties.

5. Glycol ethers (inter-ethers)

The condensation of two or more molecules of a given glycol yields inter-ethers; e. g., two molecules of ethylene glycol condense to dihydroxy diethyl ether, three molecules give the dihydroxy triethyl diether, and so on.

6. Chlorhydrins or other halohydrin.
7. Homologues of ethylene oxide, for example, butylene oxide.

It will be noted that these reactive oxygenated bodies are chemically different as a class from the non-drying glyceride oils and their fatty acids. Physically also they usually are different, e. g., many are water soluble or hygroscopic substances.

Crystalline organic acids or acid anhydrides, lactones, and so forth, likewise include a wide range of acid bodies, which, as set forth in aforesaid Serial No. 61,839 may comprehend aliphatic acids or anhydrides such as succinic, tartaric, citric, malic, maleic, fumaric, pyruvic, azelaic, sebacic, and the like, or aromatic acids or anhydrides such as phthalic, diphenic or other polybasic or polycarboxylic acids, or benzoic, salicylic or similar monobasic acids. The employment of substances yielding such acids is not precluded. Mixtures of the crystalline acids likewise may be employed. While I prefer to use crystalline acids as aforesaid, I do not wish to exclude non-crystalline acids, such as lactic, in some cases. It will be noted that the crystalline acids illustratively mentioned have as a rule less than 12 carbon atoms in the molecule and in this respect differ from the oil-acids which have 12 carbon atoms, e. g., lauric acid of cocoanut oil, or higher, e. g., those of various non-drying oils containing 16 or 18 carbon atoms in the fatty acid component.

As set forth in Serial No. 61,839 page 14, in general I prefer to employ, on the one hand, acids containing ten carbon atoms or less, these being mostly fairly water-soluble and crystallizable (lactic acid an exception) reactive with the oxygenated organic bodies stated, these likewise frequently being water-soluble or even hydroscopic (glycerol, for example) and conferring water-resistance by reaction with a water-insoluble fatty oil (or fatty acid) having at least 12 carbon atoms in the fatty acid molecule; such acquirement of water resistance being without loss of solubility in various common volatile organic solvents or mixtures of these. This feature of solubility is an important one when the product is to be used as a coating medium in paints, varnishes, nitrocellulose, lacquers, and the like. While the invention does not exclude the production of insoluble complexes, I am, in the main, seeking to prepare water-resistant products soluble in various volatile organic solvents and preferably compatible with nitrocellulose or other cellulose esters or ethers and the like, thereby to obtain a product of value in the coating and plastic field.

Example 1

| | Parts by weight |
|---|---|
| Glycerol (98 per cent C. P.) | 94 |
| Cocoanut oil | 100 |
| Para toluyl ortho benzoic acid | 720 |

These ingredients were heated together without agitation to 300° C. yielding an amber-colored resin of acid number approximately 30. It was soluble in butyl acetate, toluol and various other ordinary nitrocellulose lacquer solvents or vehicles. Although soluble in hot denatured alcohol, the solubility in the cold alcohol was not great.

Example 2

| | Parts by weight |
|---|---|
| Mixed ethylene and propylene glycols (about equal parts) | 72 |
| Fatty acids of cocoanut oil | 30 |
| Phthalic anhydride | 148 |

The ingredients likewise were heated to 300° C. without agitation until the acid number was 28.6. A soft sticky resin of dark amber color resulted. It was soluble in benzol, toluol and xylol, also in butyl acetate and other esters and in various solvent mixtures. The resin was compatible with nitrocellulose.

Example 3

| | Parts by weight |
|---|---|
| Glycol-ether (dihydroxy diethyl mono ether) | 106 |
| cocoanut oil | 40 |
| Phthalic anhydride | 148 |

On heating these substances together to induce reaction, agitation was employed and the reaction receptacle was equipped with an air-cooled reflux condenser. A viscous balsam of pale amber color and with acid number 24.2 resulted on heating to about 300° C. Although not soluble in toluol, a solution was obtained with a mixture of equal volumes of toluol and butyl acetate, or in a mixture of like proportions of benzol and denatured alcohol. This balsam is compatible with nitrocellulose and the solutions of nitrocellulose with the balsam yield clear transparent films.

Example 4

| | Parts by weight |
|---|---|
| Glycol di-ether (trihydroxy tri ethyl di ether) | 150 |
| Cocoanut oil | 20 |
| Peanut oil | 20 |
| Phthalic anhydride | 148 |

On heating to about 300° C. until the acid number was approximately 22 a viscous balsam of pale straw color was derived. It was soluble in a mixture of butyl acetate and toluol, but not in toluol alone. The balsam showed good compatibility with nitrocellulose when both were dissolved in this solvent mixture.

The proportions of nitrocellulose in coating compositions may be varied considerably with respect to the resin or balsam of the present invention. For very hard surface finish the nitrocellulose may predominate but for softer and more flexible coatings the resin or balsam (as the case may be) can be used in relatively high proportion, say from 2 to 10 parts by weight to one part of nitrocellulose.

The nitrocellulose used may be of low or high viscosity, but preferably I employ a grade slightly over 1 second and not exceeding 5 seconds viscosity in making lacquers, whereas high viscosity nitrocellulose such as celluloid cotton or smokeless powder may be employed with the resin or balsam in making molded products, plastic masses for sheeting to form the tread of felt base floor covering, and for various other purposes.

By employing a non-drying oil or its fatty acid and especially by reacting a substantially or relatively saturated glyceride oil such as cocoanut oil (or its free acids) I reduce the tendency to oxidation changes in a coating on long exposure, and the stabilization thus effected I consider to be of material benefit.

Cocoanut oil or other animal and vegetable oils embraced herein may be chilled and pressed to secure low cold test grades and either the press cake or the more liquid glycerides employed in the reaction. The free fatty acids themselves likewise may be chilled and pressed to secure different grades of varying fluidity.

Generally speaking, I prefer to employ natural glycerides or their fatty acids which are low in stearic or similar solid fats. In the case of cocoanut oil, for example, chilling and pressing allows separation into a portion of higher melting point desired in confectionary manufacture, while the more liquid portions may be utilized in making products of the present invention.

In the above examples, therefore, it is understood that cold-test cocoanut oil or the fatty acids of corresponding titre may be used. The employment of a non-drying substantially oxygen-stable cold-test glyceride oil or its fatty acids constitutes one of the specific forms of the invention.

The free fatty acids of the non-drying oils are considerably more reactive than the glycerides from which they are derived. They are used advantageously with glycerol or other polyhydric alcohol tending to readily form polymerization products which are insoluble or even infusible. Being more reactive, the desired reduction in acid number may be brought about before the final polymerization stages set in. Thus soluble resins and balsams of relatively low acid number are obtained without difficulty.

For many purposes, especially in making coating compositions, a low acid number is desirable. There is less tendency to livering with basic pigments and in the case of nitrocellulose lacquers a low acid number is considered safer. Also, if the composition is to be used for insulating purposes low acidity is desirable. A complex which has been extensively reacted so that the acid number is 30 or less thus is preferred. To obtain this relatively low index of acidity and yet to preserve solubility in various mixed organic solvents is one of the requisites of the preferred form of the present invention. This result as illustrated by the foregoing examples and by the data set forth in Serial No. 61,839 noted above, is carried out by the employment of the free fatty acids of the natural glyceride oils. These oil-acids as they are more briefly termed have a strong solvent action on the incipient resin forming from the crystalline organic acid and glycerol, pentaerythritol or other polyhydric alcohol. Without the fluxing effect of the oil-acid condensation may progress rapidly to the point where insoluble bodies of high acid number form. With the oil-acid the formation of these bodies may be arrested or prevented while other reactions are progressing leading to the assimilation of the oil-acid and the formation of a product of low acid number.

The animal and vegetable glycerides themselves do not have this fluxing action and when used with glycerol the proportion of the glyceride preferably should be small, or a non-acid flux, capable of entering into the reaction be employed. Such reactive non-acid fluxes are found for example in the glycolethers, dihydroxy diethyl mono ether (CH₂OH.CH₂.O.CH₂.CH₂OH) being an illustration of a substance very effective for the purpose.

By proceeding in accordance with the disclosures of the present invention I am thus able to control acid number with respect to solubility and thereby easily and cheaply to obtain resins, balsams and other complexes of value in the coating, plastic and insulating industries.

The distilled fatty acids of animal and vegetable oils also may be used in making the non-siccative complex. Drying or semi-drying oils may be blown to such an extent that they lose siccative properties almost completely. Reactive blown oils or their fatty acids, having substantially non-siccative qualities are included with the raw materials employed in the present invention. These include the blown derivatives of corn, cotton, soya, castor, rape and other vegetable (or animal) oils. Blowing to a condition of substantial non-siccativity introduces oxygen at double bonds and thus creates loci of condensation.

In the illustrative examples all the constituents are reacted together simultaneously. This, however, need not be the case in all circumstances as the reaction may be started with, say, two of the ingredients and the third (and fourth, etc., if used) added later, usually avoiding attainment of conditions of instability leading to formation of infusible polymers. For example, if phthalic anhydride and glycerol (a mix which readily forms insoluble condensation bodies) are being heated together, the reactive fluxing oil-acid or the neutral reactive flux, e. g., glycol-ether, preferably should be added in advance of material headway in the formation of insoluble products of condensation.

Thus the order of mixing may be varied and the process of the present invention is not restricted to the order in which the ingredients are introduced into the reaction receptacle. Broadly considered, the process comprises the heating to a combining temperature of a mixture containing a reactive oxygenated body as aforesaid, an acid body containing less than 12 carbon atoms and another acid body containing at least 12 carbon atoms, such body preferably being an oil-glyceride or oil-acid having substantially non-siccative properties, and continuing the heating until a non-siccative complex of low acidity and useful solubility results.

Instead of normal triglycerides the mono or diglycerides may be reacted with the sub-12-carbon acid and a polyhydric alcohol or other non-acid reactive oxygenated organic body aforesaid.

The sub-12-carbon acid may contain substituents such as chlorine, bromine, sulphonic or nitro groups. The 12 carbon or super-12-carbon acid likewise may carry substituents.

The term crystalline organic acid embraces those acids which are definitely solid and crystalline at room temperature (20–25° C.) and does not include as an essential component the lower fatty acids of three carbon atoms or less (liquid at such temperatures) used in conjunction with a higher fatty acid although incidental use is permissible in some cases. On the other hand such liquid lower fatty acids may be used in conjunction with an aromatic monobasic acid such as benzoic, toluyl-benzoic, salicylic and the like or polybasic acids such as phthalic, terephthalic, diphenic and so forth; all inter-reacted with a fatty acid of the lauric type of 12 carbon atoms or higher but specifically those oil-acids which form triglycerides soft or liquid at room temperature. For the purpose of the present invention I prefer the natural glyceride oil or oil-acids as free as possible from stearic acid. When complexes containing a high or influential proportion of stearic acid are admixed with nitrocellulose in solution there is a tendency to form greasy films which is avoided by using saturated or non-drying oil-acids of lower melting point.

Considering the lower fatty acids to be those up to and including three carbon acids as aforesaid, the intermediate-carbon fatty acids are those ranging from four to ten or eleven carbon atoms. The oil-acids start substantially with lauric acid (12 carbon atoms) and range upward in molecular weight and consequently in the number of carbon atoms. These high-carbon acids are restricted in the present invention to saturated fatty acids or to non-drying acids and mixtures of such acids.

In the aromatic series most of the acids or anhydrides contemplated fall in the group of intermediate-carbon acids, e. g., benzoic, 6; salicylic, 6; phthalic, 8; trimellitic, 9. Other aromatic or carbocylic acids not falling into the intermediate-carbon class, but contemplated for the production of certain species of resins hereunder are diphenic acid, toluyl benzoic acid, mellitic acid, and so forth.

The high-carbon acids of the aromatic or carbocylic series tend to produce harder products than results by the use of many of the intermediate-carbon acids or those of intermediate molecular weight.

One application of lower fatty acids is that of using acetic anhydride on the otherwise completed resin or balsam to acetylate any free hydroxyl remaining. This procedure allows of increasing water-resistance when free hydroxyl is present. Resins which may whiten slightly in water due to this hydroxyl may be acetylated by heating with an excess of acetic anhydride and distilling off the unused portion of the latter. This procedure may be applied to the resins of the examples above given, if desired.

By proceeding in accordance with the foregoing a complex may be prepared which is soluble in various organic solvents and which may be caused to yield, on saponification, the original acids (as their salts) and the oxygenated body, such as a polyhydric alcohol, in free state. Exceptions to this are bodies which break down or crack in the heating operation of preparation to give somewhat dissimilar bodies on saponification.

A specific form of the present invention is that of using a crystalline acid of a higher number of carbon atoms than 11 or 12 such as the substituted benzoic acids containing a second benzene ring, e. g., benzoyl benzoic acid, toluyl benzoic acid and even acids of still higher molecular weight such as naphthalene benzoic acid.

What I claim is:—

1. A composition of matter comprising the reaction product of polyglycerol and sebacic acid.
2. A composition of matter comprising the reaction product of blown castor oil, glycerol, and sebacic acid.
3. Composition of matter comprising the reaction product of blown castor oil, glycerol, and azelaic acid.

4. Composition of matter comprising the reaction product of blown castor oil, a polyhydric alcohol having over two hydroxyl groups, and sebacic acid.

5. A composition of matter comprising the reaction product of blown castor oil, a polyhydric alcohol having over two hydroxyl groups, and an aliphatic dibasic acid.

6. A composition of matter comprising the reaction product of blown castor oil, a polyhydric alcohol having over two hydroxyl groups, and azelaic acid.

CARLETON ELLIS.